United States Patent
Sharma et al.

(10) Patent No.: US 11,777,840 B2
(45) Date of Patent: Oct. 3, 2023

(54) RE-ESTABLISHING A BIDIRECTIONAL FORWARDING DETECTION (BFD) SESSION WHEN A DISCRIMINATOR MISMATCH IS DETECTED

(71) Applicant: Ciena Corporation, Hanover, MD (US)

(72) Inventors: Atul Sharma, Gurgaon (IN); Ritu Chawla, New Delhi (IN); Sudipta Das, New Delhi (IN)

(73) Assignee: Ciena Corporation, Hanover, MD (US)

( * ) Notice: Subject to any disclaimer, the term of this patent is extended or adjusted under 35 U.S.C. 154(b) by 63 days.

(21) Appl. No.: 17/218,216

(22) Filed: Mar. 31, 2021

(65) Prior Publication Data

US 2022/0263752 A1 Aug. 18, 2022

(30) Foreign Application Priority Data

Feb. 16, 2021 (IN) .............................. 202111006480

(51) Int. Cl.
*H04L 43/0811* (2022.01)
*H04L 43/10* (2022.01)
(Continued)

(52) U.S. Cl.
CPC .......... *H04L 45/28* (2013.01); *H04L 41/0661* (2023.05); *H04L 43/0811* (2013.01); *H04L 43/10* (2013.01); *H04L 45/22* (2013.01)

(58) Field of Classification Search
None
See application file for complete search history.

(56) References Cited

U.S. PATENT DOCUMENTS

| 9,853,722 | B1 | 12/2017 | Sharma et al. |
| 10,756,996 | B2 | 8/2020 | Sareen et al. |

(Continued)

FOREIGN PATENT DOCUMENTS

| IN | 4708/CHE/2015 A | * | 3/2017 | ............ G06F 17/00 |
| IN | 4708/CHE/2015 A | * | 3/2017 | |

OTHER PUBLICATIONS

Katz et al., "Bidirectional Forwarding Detection (BFD)", Internet Engineering Task Force (IETF), Category: Standards Track, ISSN: 2070-1721, Jun. 2010, pp. 1-49.

(Continued)

*Primary Examiner* — John A Follansbee
*Assistant Examiner* — Kamal M Hossain
(74) *Attorney, Agent, or Firm* — Baratta Law PLLC; Lawrence A. Baratta, Jr.

(57) ABSTRACT

Systems, methods, and computer-readable media are provided for re-establishing a Bidirectional Forwarding Detection (BFD) session. A method, according to one implementation, include a step of receiving, at a local end device, a first BFD control packet from a remote end device when a BFD session between the local end device and remote end device is down. For example, the first BFD control packet may include a remote discriminator number associated with the remote end device and a local discriminator number presumed to be associated with the local end device. The method further includes a step of replying to the remote end device with a second BFD control packet including an actual discriminator number of the local end device in response to determining that the local discriminator number included in the first BFD control packet is non-zero and differs from the actual discriminator number of the local end device.

19 Claims, 4 Drawing Sheets

(51) Int. Cl.
*H04L 45/28* (2022.01)
*H04L 45/00* (2022.01)
*H04L 41/0659* (2022.01)

(56) References Cited

U.S. PATENT DOCUMENTS

| | | | | |
|---|---|---|---|---|
| 11,212,163 B1* | 12/2021 | A | ......................... | H04L 43/0811 |
| 2013/0318143 A1* | 11/2013 | Li | ....................... | H04L 61/4511 |
| | | | | 709/201 |
| 2016/0036695 A1* | 2/2016 | Mirsky | ................... | H04L 43/10 |
| | | | | 370/243 |
| 2019/0268256 A1* | 8/2019 | Mirsky | ................... | H04L 43/10 |
| 2020/0344152 A1* | 10/2020 | Pignataro | ................ | H04L 45/28 |
| 2021/0184897 A1* | 6/2021 | Luan | ....................... | H04L 12/66 |

OTHER PUBLICATIONS

Allan et al., "Proactive Connectivity Verification, Continuity Check, and Remote Defect Indication for the MPLS Transport Profile", Internet Engineering Task Force (IETF), Category: Standards Track, ISSN: 2070-1721, Nov. 2011, pp. 1-21.

* cited by examiner

RE-ESTABLISHING A BIDIRECTIONAL FORWARDING DETECTION (BFD) SESSION WHEN A DISCRIMINATOR MISMATCH IS DETECTED

TECHNICAL FIELD

The present disclosure generally relates to utilizing Bidirectional Forwarding Detection (BFD) in a network. More particularly, the present disclosure relates to re-establishing a BFD session when a discriminator mismatch is detected.

BACKGROUND

Generally, Bidirectional Forwarding Detection (BFD) is a network protocol used to detect faults between two end devices and between two services. The BFD protocol allows the two end devices to establish one or more BFD sessions between the two end device points and associated with a given service, over one or more communication links. In particular, each BFD session may be established (or torn down) using a three-way handshake procedure.

For example, the three-way handshake procedure for establishing the BFD session may include the following steps: 1) the first end device sends a signal with DOWN state to the second end device, 2) the second end device sends a signal with INIT state to the first end device to acknowledge receipt of the DOWN state signal, and 3) the first end device sends a signal with UP state to the second end device to acknowledge that the INIT state signal has been received. As such, the first and second end devices are each configured to receive an acknowledgment of the connection from the other end device. For example, steps 1 and 2 establish the connection parameter for one direction, which is acknowledged, and steps 2 and 3 establish the connection parameter for the other direction, which is also acknowledged.

The BFD protocol is defined in RFC 5880, June 2010, the contents of which are incorporated by reference in their entirety. Two end devices may communicate with each other under the BFD protocol. In a first scenario, both end devices may be configured as "active" device, such that either end device can initiate a BFD session. In a second scenario, only one end device is configured as an active device, and only this device can initiate the BFD session. The other end device, in this case, is a "passive" device. The initiating device taking the active role sends a BFD control packet for a particular session, regardless of whether it has received any BFD packets for that session. A passive device does not initiate a session but only replies when it has received a BFD control packet for that BFD session from the active device.

RFC 5880 further defines a field referred to as "discriminators." BFD communication between the two end devices includes transmission of the BFD control packet, where the BFD control packet includes discriminator values. A first discriminator (i.e., referred to as "My Discriminator" or MD) is a unique, non-zero value generated by the transmitting end device itself. The MD is used as an identifier to identify the transmitting end device and is used to demultiplex multiple BFD sessions between the two end devices. A second discriminator (i.e., referred to as "Your Discriminator" or YD) is presumed to represent the discriminator value of the other end device. The YD may be obtained from the other end device during an earlier transaction and is stored for present and future transactions. Also, the YD is used to reflect back the received value designated as My Discriminator (MD) from the other end device, when this value is received. An active end device initiating a BFD session may use the value zero for YD if the value is unknown. Thus, an end device is able to learn the discriminator value from the remote end device when it receives this value in a prior transaction. As described herein, the term remote discriminator number can be the MD in a packet associated with a remote end device and the term local discriminator number can be the YD presumed to be associated with the local end device.

When bidirectional communication is achieved, and the BFD session is established, the BFD session is declared to be UP. If the communication in one or both directions is lost, the BFD session is declared to be DOWN. To re-establish a BFD session, an active end device transitions from an UP state to a DOWN state, but may then initiate the three-way handshake procedure. A session may be kept down administratively by a network operator who may force an "ADMIN-DOWN" state and sending an explanatory diagnostic code.

RFC 5880 also defines a state machine representing the various states of the BFD session on the bidirectional communication system. In particular, there are three states through which a BFD session normally proceeds: 1) DOWN, 2) INIT, and 3) UP. Two states (i.e., INIT and UP) are used for establishing a session and one state (i.e., DOWN) is used for tearing down a session. This allows the three-way handshake for both session establishment and session teardown (assuring that both end devices are aware of all session state changes). A fourth state (i.e., ADMIN-DOWN) may also be used so that a session can be administratively put down. Each end device communicates its session state in a state field in the BFD control packet. That received state, in combination with the local session state, drives the state machine.

The DOWN state means that the session is down (or is being created). A session remains in the DOWN state until the remote system indicates that it agrees that the session is down by sending a BFD control packet with the state field set to anything other than UP. If that packet signals the DOWN state, the session advances to the INIT state. If that packet signals an INIT state, the BFD session advances to the UP state. The DOWN state is used to indicate that the forwarding path is unavailable and that appropriate actions should be taken by the applications monitoring the state of the BFD session.

The INIT state means that the remote end device is communicating, and the local end device desires to bring the session up, but the remote system does not yet realize it. A BFD session will remain in the INIT state until either a BFD control packet is received that is signaling a INIT or UP state (in which case the session advances to the UP state).

The UP state means that the BFD session has successfully been established and that connectivity between the end devices is working. The BFD session will remain in the UP state until either connectivity fails or the BFD session is taken down administratively. If either the remote end device signals a DOWN state (or if a Detection Time expires), the BFD session advances to the DOWN state.

There have been updates to the BFD protocol, which are defined in RFC 6428. These updates allow for the remote discriminator to be retained until the session is exiting the DOWN state. According to RFC 5880, the active (or initiating) end device zeroes out the retained remote discriminator for the remote end device when the session went DOWN. The DOWN packets were sent with My Discriminator (MD) and Your Discriminator (YD) where MD include the value known by the transmitting device and YD is set to 0 (zero). This value of zero was treated as a trigger to bring up the session.

However, with RFC 6428, this scenario has changed. Instead of setting the YD to zero, RFC 6428 calls for the initiating device to record the YD from previous sessions with the remote device and then use this value for YD. Although this may be an improvement in some cases, there are times when this update to the BFD protocol can create problems. For instance, if the remote device powers down and is rebooted, it may come up with a new discriminator value for the same session and may not have any knowledge of this old value. Then, if the initiating device uses the old YD for trying to establish a new BFD session, the remote device will detect that the old YD (provided by the initiating device) does not match the new discriminator value and will discard the BFD control packet as being inapplicable.

Thus, in a "coordinated" mode in which one of the end devices is an active device and the other is a passive device, if the active device conforms to the standard defined by RFC 6428 and remembers the old discriminator YD, the BFD session will remain down since the passive end device will be unable to map the old discriminator to the correct BFD session. Since the BFD session will not be able to come up in this scenario, a network operator (or other human experts) may need to get involved to provide manual intervention to overcome this situation. Therefore, there is a need in the field of BFD bidirectional communication to overcome this potential shortfall in the RFC 6428 standard.

BRIEF SUMMARY

The present disclosure is directed to various embodiments for re-establishing a Bidirectional Forwarding Detection (BFD) session between two end nodes when the BFD session is down. For example, the BFD session may be down due to a passive end node restarting or rebooting. The procedures of the present disclosure are configured to re-establish the BFD session automatically even when the passive end node is restarted/rebooted with a different "discriminator" number as defined in the BFD protocol.

According to one embodiment of the present disclosure, a non-transitory computer-readable medium associated with a local end device may be configured to store computer logic having instructions that, when executed, enable a processing device to perform various processes. For example, the processing device may be enabled to receive, at the local end device, a first BFD control packet from a remote end device when a BFD session between the local end device and remote end device is down. The first BFD control packet may include a remote discriminator number (MD in packet) associated with the remote end device and a local discriminator number (YD in packet) presumed to be associated with the local end device. The processing device may further be enabled to reply to the remote end device with a second BFD control packet including an actual discriminator number of the local end device in response to determining that the local discriminator number included in the first BFD control packet is non-zero and differs from the actual discriminator number of the local end device.

According to another embodiment of the present disclosure, a method may include a step of receiving, at a local end device, a first BFD control packet from a remote end device when a BFD session between the local end device and remote end device is down. For example, the first BFD control packet may include a remote discriminator number (MD in packet) associated with the remote end device and a local discriminator number (YD in packet) presumed to be associated with the local end device. The method further includes a step of replying to the remote end device with a second BFD control packet including an actual discriminator number of the local end device in response to determining that the local discriminator number included in the first BFD control packet is non-zero and differs from the actual discriminator number of the local end device.

According to yet another embodiment of the present disclosure, a local end device configured for BFD communication may include a network interface configured to enable communication with a remote end device for exchanging BFD control packets. The local end device may also include a processing device in communication with the network interface and a memory device configured to store a computer program. The computer program may include instructions that, when executed, enable the processing device to receive a first BFD control packet from the remote end device when a BFD session with the remote end device is down. The first BFD control packet includes a remote discriminator number associated with the remote end device and a local discriminator number presumed to be associated with the local end device. The instructions further enable the processing device to reply to the remote end device with a second BFD control packet including an actual discriminator number of the local end device in response to determining that the local discriminator number included in the first BFD control packet is non-zero and differs from the actual discriminator number of the local end device.

BRIEF DESCRIPTION OF THE DRAWINGS

The present disclosure is illustrated and described herein with reference to the various drawings. Like reference numbers are used to denote like components/steps, as appropriate. Unless otherwise noted, components depicted in the drawings are not necessarily drawn to scale.

DETAILED DESCRIPTION

Figure 1:
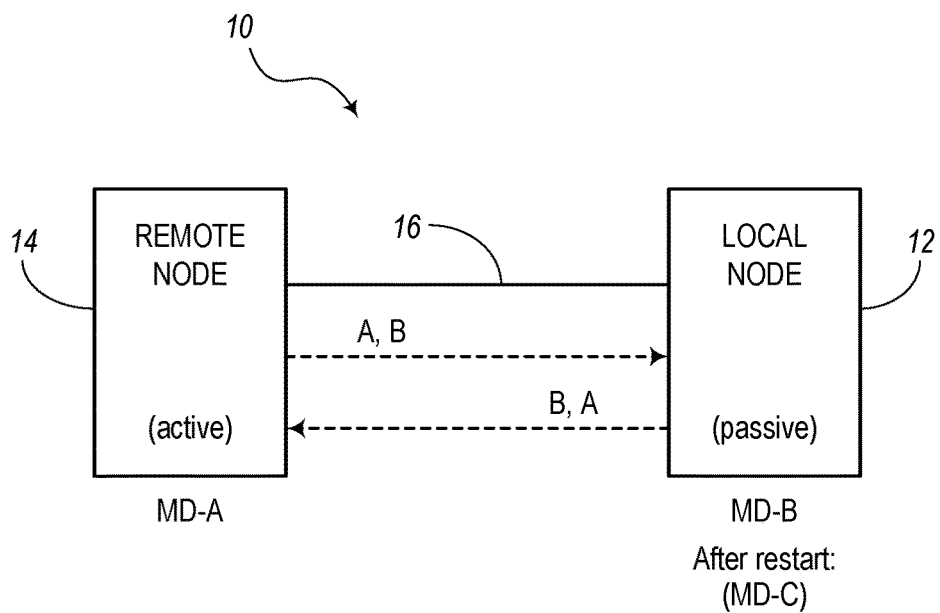
FIG. 1 is a block diagram illustrating a Bidirectional Forwarding Detection (BFD) system, according to various embodiments.

The present disclosure relates to systems and methods for establishing a Bidirectional Forwarding Detection (BFD) session between a pair of end devices (e.g., client devices, nodes, switches, etc.) in a communications network. According to various embodiments of the present disclosure, a BFD session may be established or re-established between the end devices when a current state of the BFD system is down.

BFD is the preferred Operations, Administration, and Management (OAM) protocol in Multi-Protocol Label Switching (MPLS) networks for protection switching. The preference of BFD is primarily attributed to the protocol being very simple and having a provision to flag a network fault in 10 msecs. This can make packet networks nearly as resilient as Time-Domain Multiplexing (TDM) networks, which aim for a 50 msec recovery time.

As mentioned above, the BFD protocol is captured in RFC 5880. In particular, the present disclosure is related to the field of the BFD control packet referred to as "The Discriminator" in the protocol. The Discriminator refers to the unique number (including two values) assigned to a given BFD session between the pair of participating end devices. Each end device assigns a discriminator to the given session, whereby each end device assigns a value known as "My Discriminator" for itself and refers to the discriminator value assigned by the other end device for the same session as "Your Discriminator." The Discriminator is used to demultiplex the received packets and map them to the correct BFD session.

Other terms defined by RFC 5880 for referring to the two end devices involved in the BFD communication are "active" and "passive." For example, the active end device is a system (i.e., end device) that takes the active role to send BFD control packets for a particular BFD session, regardless of whether it has received any BFD packets for that session. The passive end device takes a passive role and is not configured to begin sending BFD packets for a particular BFD session until it has received a BFD control packet for that session. Thus, the passive end device is configured to learn the discriminator value of the remote (active) end device from the remote end device itself. In a "coordinated" mode, one end device is configured in the active mode while the other is configured in the passive mode.

Compared with the conventional state machine of BFD session, the embodiments of the systems and methods of the present disclosure are configured to allow for an additional state transition in the BFD state machine. Particularly, a passive BFD end device can communicate a correct My Discriminator (MD) to the active end device after receiving a discriminator mismatch from the active end device. The active end device can accept the corrected MD (as if being received by another active device) and is configured to transition the state machine forward to subsequently help the BFD session to come up according to regular BFD procedures. In this way, the BFD system, which includes the two end devices, is able to come up automatically without the need for any manual intervention.

There has thus been outlined, rather broadly, the features of the present disclosure in order that the detailed description may be better understood, and in order that the present contribution to the art may be better appreciated. There are additional features of the various embodiments that will be described herein. It is to be understood that the present disclosure is not limited to the details of construction and to the arrangements of the components set forth in the following description or illustrated in the drawings. Rather, the embodiments of the present disclosure may be capable of other implementations and configurations and may be practiced or carried out in various ways. Also, it is to be understood that the phraseology and terminology employed are for the purpose of description and should not be regarded as limiting.

As such, those skilled in the art will appreciate that the inventive conception, upon which this disclosure is based, may readily be utilized as a basis for the designing of other structures, methods, and systems for carrying out the several purposes described in the present disclosure. Those skilled in the art will understand that the embodiments may include various equivalent constructions insofar as they do not depart from the spirit and scope of the present invention. Additional aspects and advantages of the present disclosure will be apparent from the following detailed description of exemplary embodiments which are illustrated in the accompanying drawings.

FIG. 1 is a block diagram illustrating an embodiment of a BFD system 10, which includes a local node 12 (or local end device) and a remote node 14 (or remote end device). In this example, the local node 12 is considered to be a passive device (i.e., operating in a passive mode) and the remote node 14 is considered to be an active device (i.e., operating in an active mode). The local node 12 and remote node 14 are able to communicate with each other via a single communication link 16 (or tunnel). In this embodiment, the local node 12 and remote node 14 are configured to conduct BFD communication (e.g., BFD sessions) over the single communication link 16. In other embodiments, the BFD system 10 may include multiple links connecting the nodes 12, 14 to allow for multiple BFD sessions, whereby the nodes are configured to identify the particular BFD session and corresponding link by the discriminator values.

As shown in FIG. 1, the BFD system 10 has a BFD session that is open (i.e., in an UP state). The remote node 14 has a My Discriminator (MD) value represented by the character "A" and has a Your Discriminator (YD) value represented by the character "B." Inversely, the local node 12 has an MD of B and a YD of A. Again, as defined in RFC 5880, MD is "a unique, non-zero discriminator value generated by the transmitting system, used to demultiplex multiple BFD sessions between the same pair of systems" and YD is a "discriminator received from the corresponding remote system. This field reflects back the received value of My Discriminator, or is zero if that value is unknown."

While the BFD session is UP and running, the local node 12 (e.g., passive device) may shut down for any number of reasons. For example, the local node 12 may undergo a chassis restart, a fault on the local node 12 may be fixed, or other reboot conditions may occur. There is a possibility that the local node 12 may be restarted, reset, rebooted, etc. with a different MD value. There can be other reasons of change of MD in addition to reboot such as deleting some BFD sessions and then creating them in different order. The present disclosure contemplates any reason. Therefore, instead of maintaining the value of B, the MD may come up as a new discriminator value, such as "C" for the same BFD session. Since the local node 12 is the passive node in this example, the remote (active) end device, according to conventional BFD processes, will not be aware of this change. Therefore, the remote end device 14 may continue to send out BFD control packets along the communication link 16 with the state of DOWN and a YD of B.

Regarding the update to the BFD protocol in RFC 6428, when a BFD system is operating in a "coordinated" mode (e.g., one active device and one passive device with single BFD session on each node serving both directions), the active device (e.g., the remote end device 14) should not reset the YD of the passive device (e.g., the local end device 12) until it is exiting the DOWN state. The demultiplexing logic on the local (passive) end device 12 would ideally discard any BFD control packet from the active device since it no longer recognizes the BFD session having the discriminator value of B, since the local node 12 has the new MD of C. Conventionally, the restarted local node 12 does not have any way to inform the remote node 14 of this change.

Therefore, when this condition arises in conventional system, the BFD session will never be able to come up, even though the data path along communication link 16 (e.g., tunnel) is capable of handling the transaction. To account for this previously-unaddressed concern, the embodiments of the present disclosure are configured to provide solutions for overcoming the deficiencies in the conventional systems. According to some embodiments, the present disclosure is configured to alter the BFD state machine to accommodate this problematic scenario to ensure that the BFD session can come up automatically without manual intervention.

Figure 2:
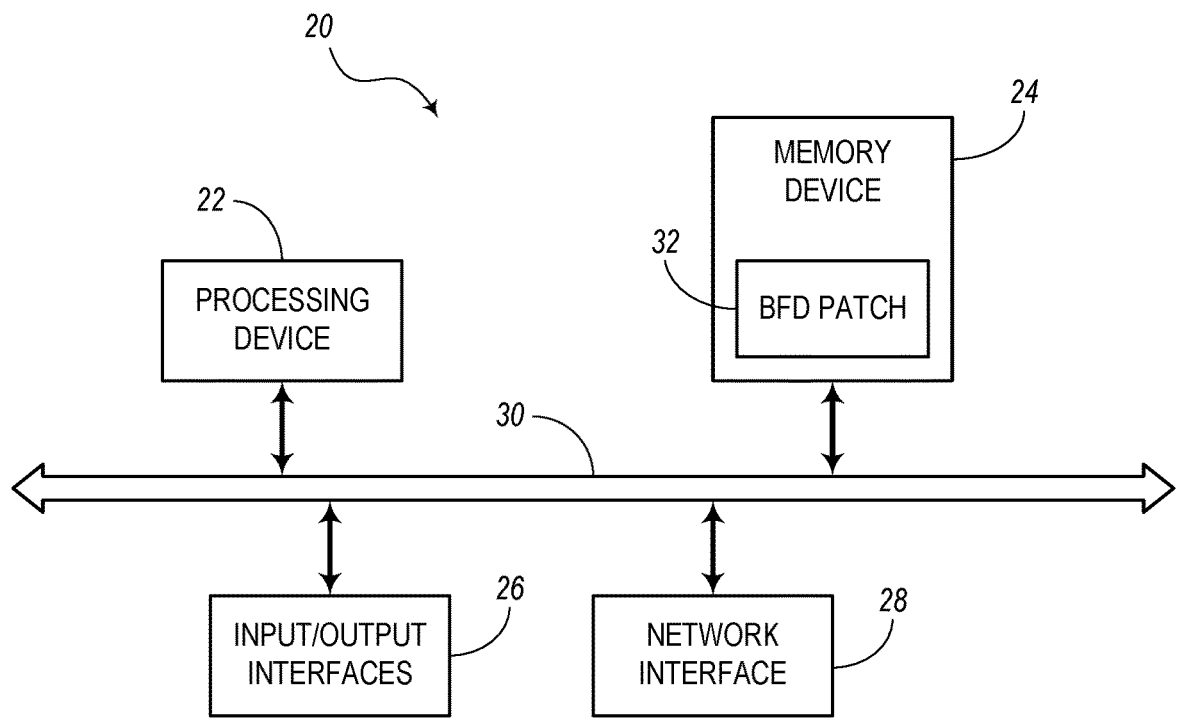
FIG. 2 is a block diagram illustrating an end device of the BFD system of FIG. 1, according to various embodiments.

FIG. 2 is a block diagram illustrating an embodiment of an end device 20 of the BFD system 10 of FIG. 1. For example, the end device 20 may represent the local node 12, the remote node 14, and/or other end devices, nodes, etc. configured for BFD communication. In the illustrated embodiment, the end device 20 may be a digital computer that, in terms of hardware architecture, generally includes a processing device 22, a memory device 24, Input/Output (I/O) interfaces 26, and a network interface 28. The memory device 24 may include a data store, database, or the like. It should be appreciated by those of ordinary skill in the art that FIG. 2 depicts the end device 20 in a simplified manner, where practical embodiments may include additional components and suitably configured processing logic to support known or conventional operating features that are not described in detail herein. The components (i.e., 22, 24, 26, 28) are communicatively coupled via a local interface 30. The local interface 30 may be, for example, but not limited to, one or more buses or other wired or wireless connections. The local interface 30 may have additional elements, which are omitted for simplicity, such as controllers, buffers, caches, drivers, repeaters, receivers, among other elements, to enable communications. Further, the local interface 30 may include address, control, and/or data connections to enable appropriate communications among the components 22, 24, 26, 28.

According to various embodiments of the present disclosure, the end device 20 may include a BFD patch 32. The BFD patch 32 may be configured in software or firmware and stored in the memory device 24. In other embodiments, the BFD patch 32 may be configured in hardware in the processing device 22. The BFD patch 32, according to still other embodiments, may be configured in any combination of hardware, software, and/or firmware.

The BFD patch 32 may be configured to overcome the potential problem that may arise with the update BFD protocol defined in RFC 6428. Thus, BFD patch 32 may be considered to be a software patch for modifying any existing software already in use with respect to implementing BFD session under RFD 6428. In particular, the BFD patch 32 may be configured to enable the processing device 22 to receive, at a local end device (e.g., local node 12), a first BFD control packet from a remote end device (e.g., remote node 14) when a BFD session between the local end device and remote end device is down. The first BFD control packet may include a remote discriminator number (MD in the BFD packet) associated with the remote end device and a local discriminator number (YD in the BFD packet) presumed to be associated with the local end device. In response to determining that the local discriminator number included in the first BFD control packet is non-zero and differs from the actual discriminator number of the local end device, the BFD patch 32 may further be configured to reply to the remote end device with a second BFD control packet including the actual discriminator number of the local end device.

The processing device 22 is a hardware device adapted for at least executing software instructions. The processing device 22 may be any custom made or commercially available processor, a Central Processing Unit (CPU), an auxiliary processor among several processors associated with the end device 20, a semiconductor-based microprocessor (in the form of a microchip or chip set), or generally any device for executing software instructions. When the end device 20 is in operation, the processing device 22 may be configured to execute software stored within the memory device 24, to communicate data to and from the memory device 24, and to generally control operations of the end device 20 pursuant to the software instructions.

It will be appreciated that some embodiments of the processing device 22 described herein may include one or more generic or specialized processors (e.g., microprocessors, CPUs, Digital Signal Processors (DSPs), Network Processors (NPs), Network Processing Units (NPUs), Graphics Processing Units (GPUs), Field Programmable Gate Arrays (FPGAs), and the like). The processing device 22 may also include unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry" or "logic" that is "configured to" or "adapted to" perform a set of operations, steps, methods, processes, algorithms, functions, techniques, etc., on digital and/or analog signals as described herein for the various embodiments.

The I/O interfaces 26 may be used to receive user input from and/or for providing system output to one or more devices or components. User input may be provided via, for example, a keyboard, touchpad, a mouse, and/or other input receiving devices. The system output may be provided via a display device, monitor, Graphical User Interface (GUI), a printer, and/or other user output devices. I/O interfaces 26 may include, for example, one or more of a serial port, a parallel port, a Small Computer System Interface (SCSI), an Internet SCSI (iSCSI), an Advanced Technology Attachment (ATA), a Serial ATA (SATA), a fiber channel, InfiniBand, a Peripheral Component Interconnect (PCI), a PCI eXtended interface (PCI-X), a PCI Express interface (PCIe), an Infra-Red (IR) interface, a Radio Frequency (RF) interface, and a Universal Serial Bus (USB) interface.

The network interface 28 may be used to enable the end device 20 to communicate over a network, the Internet, a Wide Area Network (WAN), a Local Area Network (LAN), and the like. In particular, the network interface 28 may be connected to a tunnel or link (e.g., communication link 16) for enabling communication with the other end device of the pair of end devices configured for BFD communication. The network interface 28 may include, for example, an Ethernet card or adapter (e.g., 10 BaseT, Fast Ethernet, Gigabit Ethernet, 10 GbE) or a Wireless LAN (WLAN) card or adapter (e.g., 802.11a/b/g/n/ac). The network interface 28 may include address, control, and/or data connections to enable appropriate communications on the network or link.

The memory device 24 may include volatile memory elements (e.g., Random Access Memory (RAM)), such as Dynamic RAM (DRAM), Synchronous DRAM (SDRAM), Static RAM (SRAM), and the like, nonvolatile memory elements (e.g., Read Only Memory (ROM), hard drive, tape, Compact Disc ROM (CD-ROM), and the like), and combinations thereof. Moreover, the memory device 24 may incorporate electronic, magnetic, optical, and/or other types of storage media. The memory device 24 may have a distributed architecture, where various components are situated remotely from one another, but can be accessed by the processing device 22. The software in memory device 24 may include one or more software programs, each of which may include an ordered listing of executable instructions for implementing logical functions. The software in the memory device 24 may also include a suitable Operating System (O/S) and one or more computer programs. The O/S essentially controls the execution of other computer programs, and provides scheduling, input-output control, file and data management, memory management, and communication control and related services. The computer programs may be configured to implement the various processes, algorithms, methods, techniques, etc. described herein.

The memory device 24 may include a data store used to store data. In one example, the data store may be located internal to the end device 20 and may include, for example, an internal hard drive connected to the local interface 30 in the end device 20. Additionally, in another embodiment, the data store may be located external to the end device 20 and may include, for example, an external hard drive connected to the Input/Output (I/O) interfaces 26 (e.g., SCSI or USB connection). In a further embodiment, the data store may be connected to the end device 20 through a network and may include, for example, a network attached file server.

Moreover, some embodiments may include a non-transitory computer-readable storage medium having computer readable code stored in the memory device 24 for programming the or other processor-equipped computer, server, appliance, device, circuit, etc., to perform functions as described herein. Examples of such non-transitory computer-readable storage mediums include, but are not limited to, a hard disk, an optical storage device, a magnetic storage device, a Read Only Memory (ROM), a Programmable ROM (PROM), an Erasable PROM (EPROM), and Electrically Erasable PROM (EEPROM), Flash memory, and the like. When stored in the non-transitory computer-readable medium, software can include instructions executable by the processing device 22 that, in response to such execution, cause the processing device 22 to perform a set of operations, steps, methods, processes, algorithms, functions, techniques, etc. as described herein for the various embodiments.

Figure 3:
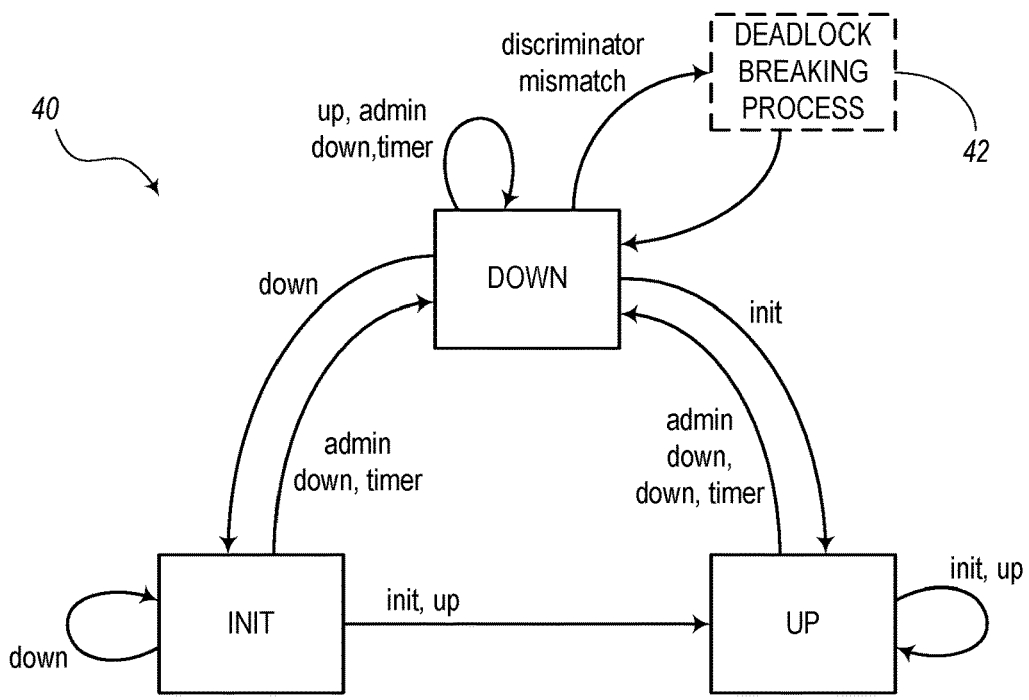
FIG. 3 is a diagram illustrating a state machine of different states of a BFD session, according to various embodiments.

FIG. 3 is a state machine 40 showing different states of a BFD session according to embodiments corresponding to the present disclosure. The state machine 40 include similarities to the state machines associated with the BFD protocol. However, the state machine 40 in this embodiment includes a new sequence of one or more steps ("deadlock breaking process" 42) for processing BFD control packets under certain conditions that may otherwise cause problems in conventional systems. The new step of breaking the deadlock (e.g., deadlock breaking process 42, BFD patch 32, or other suitable sequence) may be performed when the state machine 40 is in the DOWN state and includes checking the YD of the BFD control packet to see if there is a mismatch with an actual discriminator of the respective end device (or node).

When the state machine 40 receives a BFD control packet from the other end device with a non-zero Your Discriminator (YD) value while in the DOWN state and this YD does not match the locally stored My Discriminator (MD) in the local node for that BFD session, conventional system would have been unable to demultiplex and process the BFD control packet. However, the end device 20 can utilize the deadlock breaking process 42 (e.g., BFD patch 32) such that the BFD control packet can be accepted, based on the tunnel or link (e.g., communication link 16) on which the BFD control packet was received. The deadlock breaking process 42 may be configured to demultiplex the BFD control packet based on available parameters.

In this embodiment, the state machine 40 of the BFD does not transition out of the DOWN state, but the local node can send out a new BFD packet with the DOWN state in response the first BFD control packet received. The deadlock breaking process 42 is configured to place the correct My Discriminator (MD) (e.g., C) in the DOWN packet for transmission to the remote end device. As a result, the remote end device (e.g., remote node 14), upon receiving this packet is configured to update its own database with the correct Your Discriminator (YD) from the received packet. Once the discriminator (YD) is updated on the remote end device, the initiation of the BFD session can proceed normally in order to break the deadlock condition.

Figure 4:
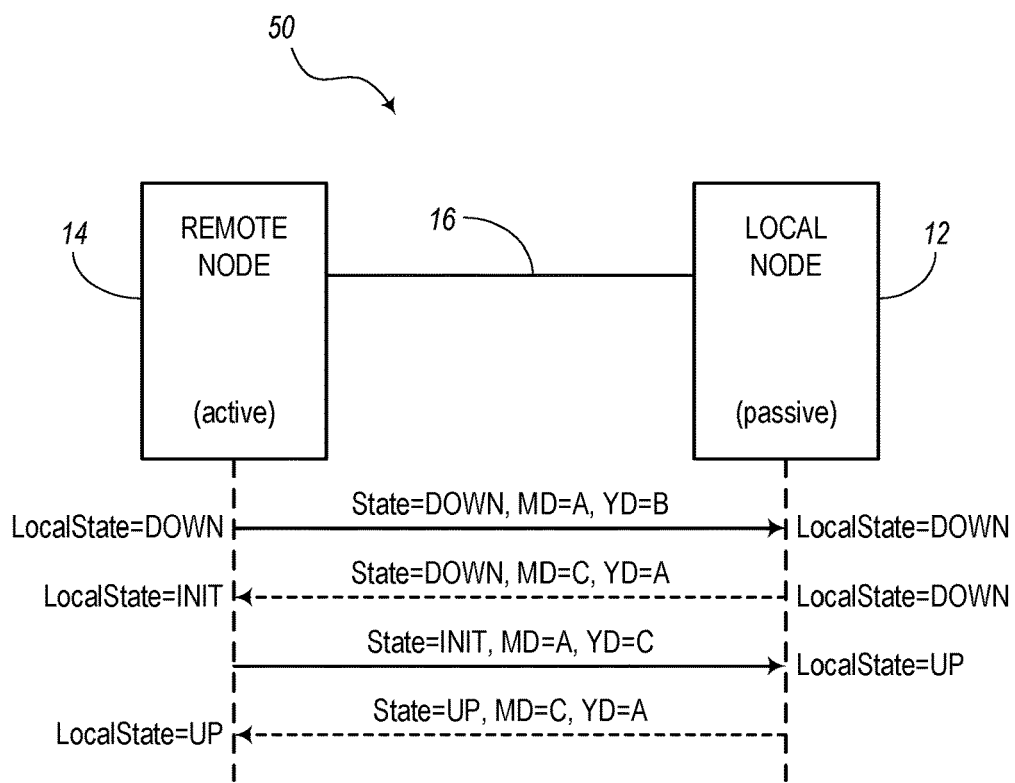
FIG. 4 is a diagram illustrating a four-way handshaking procedure for initiating a BFD session, according to various embodiments.

FIG. 4 is a diagram illustrating an embodiment of a four-way handshaking procedure 50 for initiating a BFD session between the local node 12 and the remote node 14. According to this example, the local node 12 is in a passive mode and has been restarted. Before being restarted, the local node 12 included an old MD having a value represented by the character "B," but after being restarted, the local node 12 came up with new MD having a value represented by the character "C" for the same BFD session. Also, the remote node 14 in this example is in an active mode and has a MD of A.

In a first step of the four-way handshaking procedure 50, the remote node 14 has a local state of DOWN and send a first BFD packet with state=DOWN, MD=A, and YD=B. The local node 12 receive this first BFD packet while its local state is DOWN. Normally, according to conventional procedures, the local node 12 would reject or discard this first BFD packet since the YD (i.e., B) does not match the actual MD (i.e., C) since the MD of the local node 12 changed from B to C during the restart process. However, instead of discarding the BFD packet, the four-way handshaking procedure 50 of the present disclosure is configured to proceed with establishing the BFD session. While the local state of the local node 12 remains in DOWN, a second step of the four-way handshaking procedure 50 is executed whereby the local node 12 is configured to send a reply packet (e.g., a second BFD packet) to the remote node 14 with state=DOWN, MD=C, and YD=A. Thus, the local node 12, with assistance from the BFD patch 32 or deadlock breaking process, is configured to send the "correct" my discriminator value of C At this point, the remote node 14 receives the second BFD packet with a matching YD value (i.e., A). Since the remote node 14 recognized the YD as matching its MD value, it essentially can consider this BFD packet as an initiating packet from an active device, even though it is actually received from a passive device (e.g., local node 12) acting in a new mode of responding to a mismatch. The remote node 14 may be configured to store this new discriminator value (i.e., C) in memory for use in later BFD sessions. The remote node 14 transitions its local state to INIT and send a third BFD packet with state=INIT, MD=A, and YD=C. The YD=C is the value replaced in memory upon receiving the second BFD packet. The local node 12 is configured to receive the third BFD packet. Since it receives this packet with a state of INIT, it is configured to transition its state to UP.

In the fourth step of the four-way handshaking procedure 50, the local node 12 is configured to send a fourth BFD packet with state=UP, MD=C, and YD=A. The remote node 14 receives the fourth BFD packet and transitions its state to UP. At this time, the BFD session has been established and the nodes 12, 14 can operate in the BFD session according to normal procedures. Thus, with only one extra step, the four-way handshaking procedure 50 is able to recover from a situation that may otherwise have been a deadlock or impasse in conventional systems. In some respects, the last three steps may be considered as being similar to known three-way handshaking procedures in a situation where both end devices are active.

It should be noted that the BFD patch 32, deadlock breaking process 42, and/or four-way handshaking procedure 50 do not go against any recommendations of the currently used RFCs, but provides a way to overcome a potential problem while working within the realm of the existing RFCs. In the present disclosure, the passive end (e.g., local node 12) is able to communicate its updated MD to the remote node 14 only as a response to an already received packet. The present embodiments may be implemented in any software and/or hardware products to handle BFD scenarios under the new RFC 6428. Moreover, the embodiments described herein are backward compatible.

Figure 5:
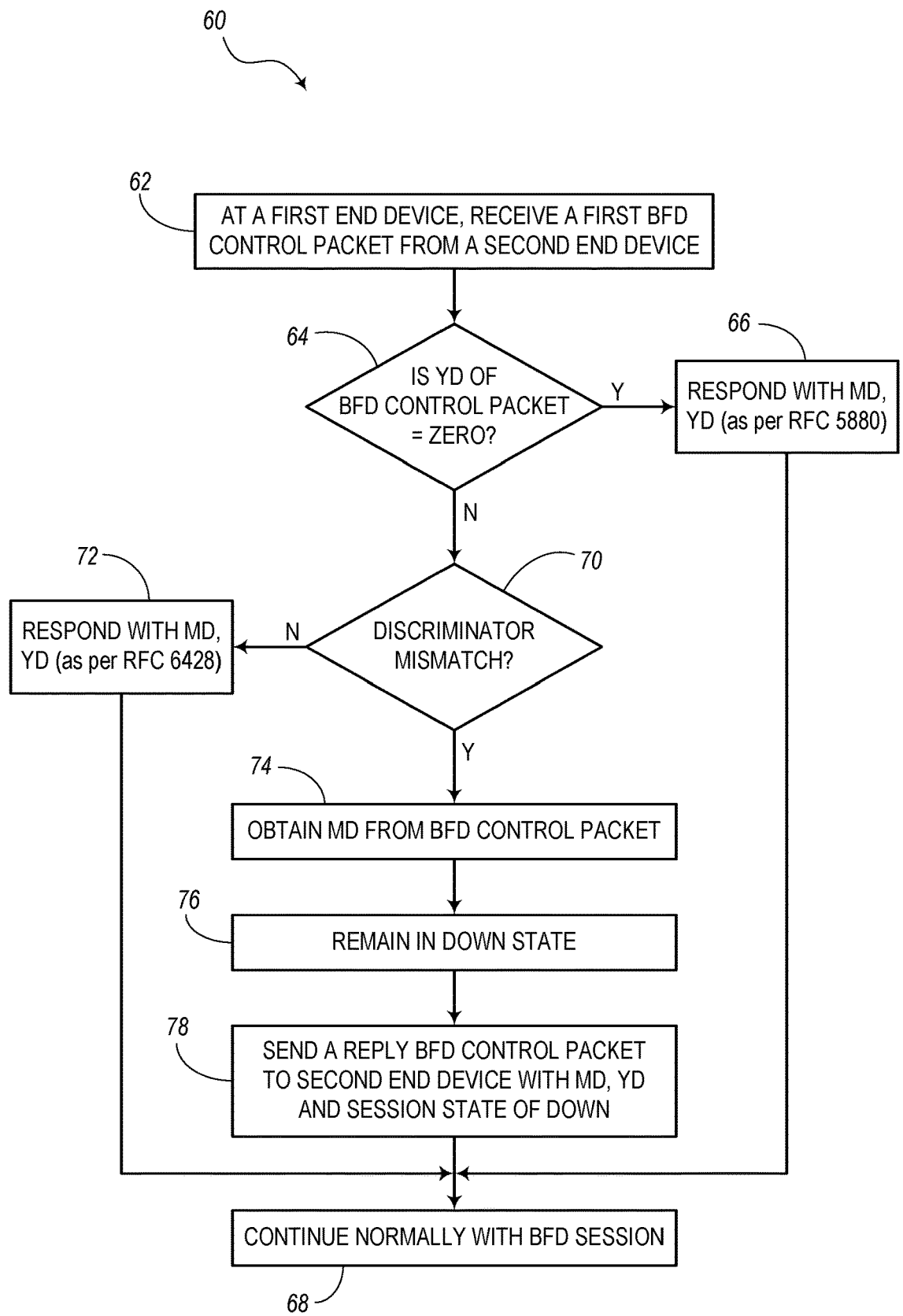
FIG. 5 is a flow diagram illustrating a process for establishing a BFD session between two end devices, according to various embodiments.

FIG. 5 is a flow diagram showing an embodiment of a process 60 for establishing a BFD session between two end devices. The process 60 is configured to operate when the state of the BFD session as recorded at both the end devices is DOWN. Also, the process 60 may be performed at a local end device (e.g., node 12). In the embodiment of FIG. 5, the process 60 is configured, at the local end device (e.g., node 12), to receive a BFD control packet from a remote end device (e.g., node 14), as indicated in block 62. Decision block 64 includes a step of determining if the YD of the BFD control packet (i.e., MD of the local end device) is equal to zero. If so, then it may be recognized as a regular RFC 5880 procedure and the process 60 is configured to proceed to block 66. In block 66, the local end device responds with second BFD control packet including its state (i.e., DOWN), the MD number, and the YD number (as per RFC 5880). Then, the process 60 goes to block 68, which indicates that the BFD session can proceed normally by finishing the establishment or initialization of the BFD session and running the session as usual under regular protocols.

However, if it is determined in decision block 64 that the YD is not zero, then the process 60 continues to decision block 70. In this embodiment, decision block 70 includes determining if there is a discriminator mismatch (e.g., if the YD of the BFD control packet does not match the MD stored at the local end device). If there is no mismatch, the process 60 branches off to block 72, which indicates that the local end device responds with a second BFD control packet including its state (i.e., DOWN), the MD number, and the YD number (as per RFC 6428). Then, the process 60 jumps to block 68 to continue normally with the BFD session by finishing the establishment or initialization of the BFD session and running the session as usual under regular protocols.

If it is determined in decision block 70 that there is a discriminator mismatch (e.g., if YD of the BFD control packet does not match the MD stored at the local end device), then the process 60 is configured to proceed to block 74 to start the modified execution of BFD session initiation according to the embodiments of the present disclosure. Block 74 includes the step of obtaining (and storing) the MD from the first BFD control packet that represents the discriminator associated with the second (remote) end device. The local end device is then configured to remain in the DOWN state, as indicated in block 76. Then at block 78, the process 60 includes the step of sending a reply BFD control packet from the local end device to the remote end device with the state=DOWN, the MD number=the new value, and the YD number=the MD obtained in block 74. After this adjustment is made to correct the MD number with the new value, the process 60 is configured to continue running normally with the BFD session according to normal protocol.

Figure 6:
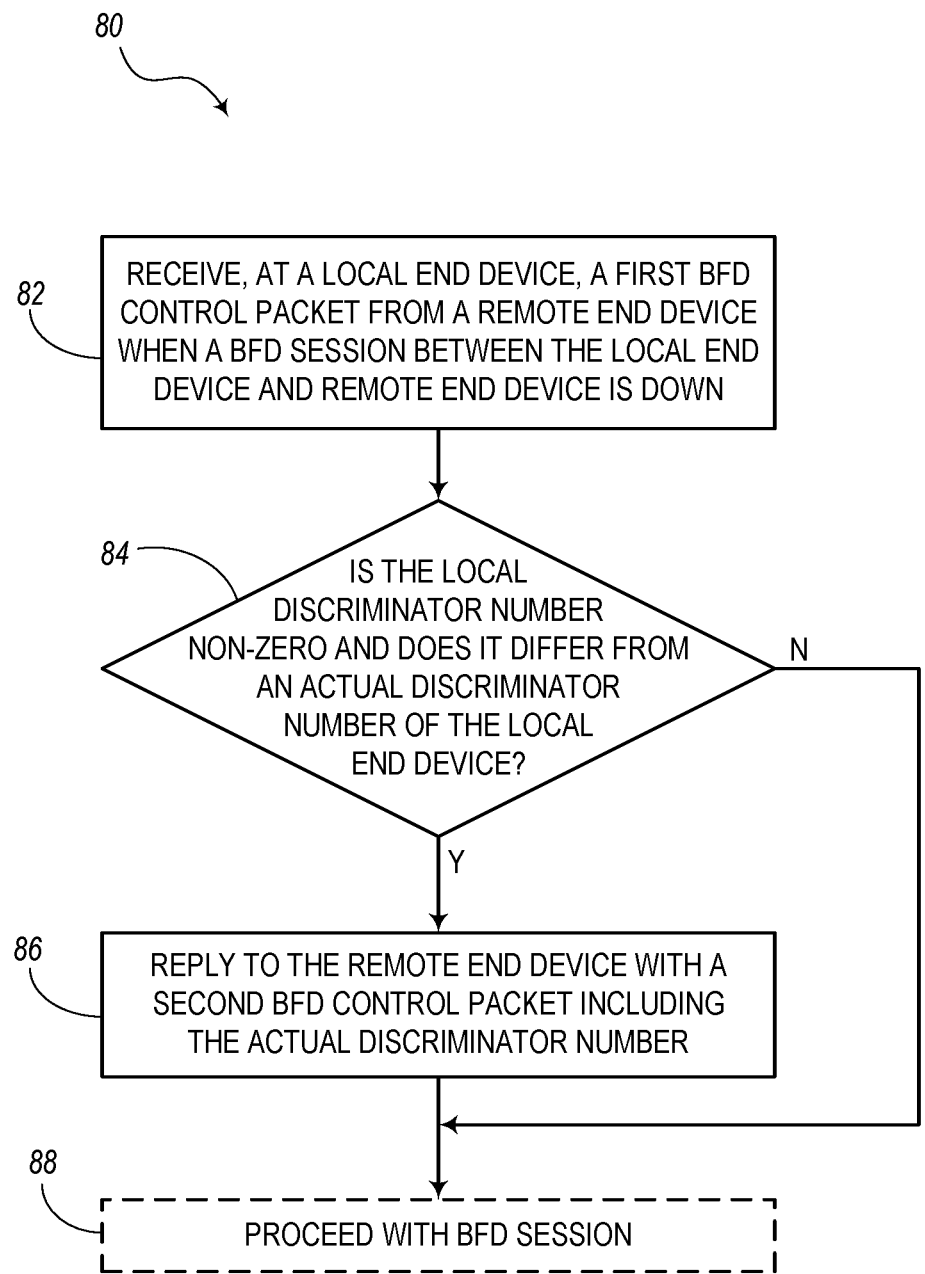
FIG. 6 is a flow diagram illustrating a general process for establishing a BFD session, according to various embodiments.

FIG. 6 is a flow diagram showing an embodiment of another process 80, which is configured to perform a generalized set of steps for establishing a BFD session. In this embodiment, the process 80 includes receiving, at a local end device, a first BFD control packet from a remote end device when a BFD session between the local end device and remote end device is DOWN, as indicated in block 82. The process 80 is further configured to determine if your discriminator number is non-zero and if it differs from an actual discriminator number of the local end device, as indicated in decision block 84. If not, the process 80 is configured to skip block 86 and continue normally with the BFD session, as indicated in block 88. Otherwise, if it is determined in decision block 84 that the your discriminator number is non-zero and it differs from the actual discriminator number of the local end device, then the process continues on to block 86. As indicated in block 86, the process 80 includes replying to the remote end device with a second BFD control packet including the actual my discriminator number and then goes to block 88.

Additionally, the local end device may be a passive device and the remote end device may be an active device, whereby the local end device and remote end device may be configured to operate in a coordinated mode in which only the active device is configured to initiate a BFD session. The steps of receiving the first BFD control packet from the remote end device and replying to the remote end device with the second BFD control packet may be configured to constitute two steps of a four-way handshaking procedure. For example, the four-way handshaking procedure may be utilized to re-establish the BFD session when the BFD session is down.

The process 80 may further be defined whereby the BFD session may be re-established after the local end device experiences a reboot procedure. Also, replying to the remote end device with the second BFD control packet (including the actual My Discriminator number) may be configured to break a deadlock condition when a discriminator mismatch is detected. The second BFD control packet may include a My Discriminator (MD) having the actual discriminator number of the local end device and in the down state. The process 80 may be configured in computer logic and may be a patch for a protocol associated with BFD.

In addition, the above-described embodiments may further be configured for updating BFD protocol. The discriminator, which is one of the fields of the BFD packet, is used to determine the BFD session. The BFD can be compared to a heartbeat, where it periodically sends a packet (e.g., every 3.3 msecs, 10 msecs, 50 msecs, 100 msecs, etc.) to make sure the service connectivity over a link is up. If the packet is missed and no reply signal is received, the BFD retries. After three (or more) misses, the BFD session can be transitioned to a DOWN state.

The BFD may include an active node that sends a packet and a passive node that receives the packet. The BFD protocol runs between this pair of nodes. In some embodiments, there may be two nodes configured to be active, so that both of them can proactively send a packet to initiate or establish a BFD session. However, in the scenario where one is configured as active and the other as passive, the active one starts the initialization of the BFD session by sending out the first BFD control packet. The passive end is supposed to reply to a BFD packet that it received, but it cannot initiate sending a packet on its own.

In the BFD session, the discriminator field include the My Discriminator (MD) for each node. For example, node A (active) may have a discriminator MD-A and node B (passive) may have a discriminator MD-B. As described above, the MD is a unique number that identifies the session on the active end as A and the session on the passive end as B. When a packet is sent from node A, it includes the MD (i.e., MD-A) and also includes a discriminator number for what the node A presumes is Your Discriminator (YD) for identifying the passive node B.

Typically, when the packets are being sent for the first time with respect to a new session that has never been established before, the active node A knows its own discriminator (MD) but does not know the remote discriminator (YD). In this normal case, the active node A will fill in a zero for YD and send discriminator A, 0. When the passive end receives the packet with the YD set to zero, it is configured to respond back with a MD that correctly indicates its actual value (e.g., B) along with the newly learned discriminator from the active node A, such that the discriminator in this return signal will be B, A, i.e., YD=B and MD=A.

When the node A receives signal B, A, it then can learn the remote node is B. This is specified in the RFCs. With the updated RFC 6428, when the BFD session is UP and running, node A continues to send signal of A, B and node B continues to send signal of B, A. At this point, everything runs smoothly. However, as mentioned above, there is a possibility that passive node B may restart. For example, it may power down and then power back up, or a controller card of node B may go down completely and then come back up again, or other restart or reboot situations. When it comes back up again, this session is basically DOWN, having missed three (or more) attempts to reconnect. According to RFC, the active end sends the three packets to which there is no reply from the passive end and the active node concludes that the session is DOWN.

The version of BFD protocol related to RFC 6428 includes a provision where the active node A can try to re-establish the BFD session with the passive node B when the BFD state machine is transitioned to the DOWN state during the recovery time. However, the provision allows the active node A to continue sending packets with A, B (instead of A, 0) to the remote end to restart the session. Normally, the memory of the end devices would be flushed, but the new provision allows the active node A to keep the value B. A problem exists, however, when node B restarts but comes up with a new discriminator (e.g., C). Since node A remember B, it tries A, B, which does not include the correct value C at this point.

The passive end (node B) will not recognize the value B, since association of discriminator B with the BFD session is lost during the restarting process, since it is now C and does not remember having discriminator B because the entire node had to be rebooted. Thus, it is going to be confused and discard this packet. It cannot map this to correct session that has discriminator B. The old discriminator could have been assigned to a different BDF session, so the discriminator could exist, but not mapped to the correct session.

Now when this packet with A, B continues to be discarded, the BFD system essentially is deadlocked. The active node A has no way, according to RFC 6428, to update B to C or make any correction in this respect. The active node A continues sending the packets and the hardware of passive node B continues discarding them because it cannot map B. Since node B is not going to reply, the active node A has no way to relearn the correct discriminator of the passive node B.

Nevertheless, the present disclosure is able to overcome this deficiency or potential issue. As mentioned above, the embodiments of the present disclosure are able to provide relief in this situation where the passive node B receives the packet with discriminator B, which has been replaced with C with no knowledge of the previous value B. Instead of discarding the packet, as before, the hardware of the present disclosure is configured to accept the BFD control packet with the incorrect discriminator B and process the packet. The mechanism described herein continues to remain in the DOWN state and does not make any change in the state machine. Instead, the passive node B is configured to respond with a DOWN packet and update the MD to C but keep the YD based on what is learned. That is, it set YD to the value represented by "A." Once this packet is built, the passive node B is configured to respond by sending out the new BFD control packet to node A.

Also, when node A receives DOWN packet C, A, is configured to accept the packet because it has the correct discriminator A and will be able to map it. The node A may be configured at this point to realize that it sent out a packet with YD of B, but it received a packet with the YD of C. From this, the node A can learn and replace B in its memory with C. Then the active node A sends out an INIT packet with A, C acknowledging that node A now understands that the passive node B now has discriminator value C). After this, the BFD session is going to come up exactly like a regular new session.

When the active side sends A, C, that packet will be processed by the passive node B because now it is fine with the discriminator C. Only then will it come out of its DOWN state and move to next state of UP. The present disclosure provides that the passive end is configured to remain in the DOWN state only, unless and until the active end correctly relearns its new discriminator, which in this example is C.

In the DOWN state, the node B receives a packet from the remote node A, and it continues in the DOWN state because it has detected a discriminator mismatch condition. Node B will transmit the new BFD control packet with the DOWN state. When node B is down and receives a down packet and then find that there is a discriminator mismatch, it continues in the DOWN state and sends the packet with the correct discriminator that it now has.

The systems and methods of the present disclosure provide novelty over the existing BFD protocols, namely, RFC 5880 and RFC 6428. For instance, the present embodiments include hardware (e.g., end devices) configured to accept a BFD packet with a discriminator that is locally known to be incorrect. Also, the present disclosure introduces a new state transition in the BFD state machine for processing a BFD control packet when a mismatch in the local discriminator is detected. This state transition, for example, occurs on receipt of a DOWN BFD frame with a non-zero, discriminator mismatch. The present embodiments are also configured to respond to the first BFD packet with a subsequent packet that includes the DOWN state and correct discriminator even when it had been determined previously that a discriminator mismatch existed.

Although the present disclosure has been illustrated and described herein with reference to exemplary embodiments providing various advantages, it will be readily apparent to those of ordinary skill in the art that other embodiments may perform similar functions, achieve like results, and/or provide other advantages. Modifications, additions, or omissions may be made to the systems, apparatuses, and methods described herein without departing from the spirit and scope of the present disclosure. All equivalent or alternative embodiments that fall within the spirit and scope of the present disclosure are contemplated thereby and are intended to be covered by the following claims.

What is claimed is:

1. A non-transitory computer-readable medium associated with a local end device and configured to store computer logic having instructions that, when executed, enable a processing device to:
responsive to a Bidirectional Forwarding Detection (BFD) session being down and the local end device restarts or reboots with a first local discriminator number for the BFD session with a remote end device, receive, at the local end device, a first BFD control packet from the remote end device, the first BFD control packet including a remote discriminator number associated with the remote end device and a second local discriminator number presumed to be associated with the local end device but is known to be incorrect by the local end device, wherein the second local discriminator number is presumed based on (i) the first BFD control packet having the remote discriminator number, (ii) the second local discriminator number being different from the first local discriminator number, (iii) the second local discriminator number is non-zero, and (iv) the local end device has restarted or rebooted,
reply to the remote end device with a second BFD control packet including the first local discriminator number of the local end device in response to determining that the second local discriminator number is known to be incorrect, and
receive a third BFD control packet from the remote end device including the remote discriminator number associated with the remote end device and the first local discriminator number.

2. The non-transitory computer-readable medium of claim 1, wherein the local end device is a passive device and the remote end device is an active device, and wherein the local end device and remote end device are configured to operate in a coordinated mode in which only the active device is configured to initiate a BFD session.

3. The non-transitory computer-readable medium of claim 1, wherein receiving the first BFD control packet from the remote end device and replying to the remote end device with the second BFD control packet constitute two steps of a four-way handshaking procedure.

4. The non-transitory computer-readable medium of claim 3, wherein the four-way handshaking procedure is utilized to re-establish the BFD session when the BFD session is down.

5. The non-transitory computer-readable medium of claim 1, wherein the BFD session is re-established after the local end device experiences a reboot procedure.

6. The non-transitory computer-readable medium of claim 1, wherein replying to the remote end device with the second BFD control packet, which includes the first local discriminator number, is configured to break a deadlock condition when a discriminator mismatch is detected.

7. The non-transitory computer-readable medium of claim 1, wherein the computer logic is configured as a patch for a protocol associated with BFD.

8. The non-transitory computer-readable medium of claim 1, wherein an existing state machine for the BFD session is configured to update an actual discriminator number of the local end device.

9. A method comprising the steps of:
responsive to a Bidirectional Forwarding Detection (BFD) session being down and a local end device restarts or reboots with a first local discriminator number for the BFD session with a remote end device, receiving, at the local end device, a first BFD control packet from the remote end device, the first BFD control packet including a remote discriminator number associated with the remote end device and a second local discriminator number presumed to be associated with the local end device but is known to be incorrect by the local end device, wherein the second local discriminator number is presumed based on (i) the first BFD control packet having the remote discriminator number, (ii) the second local discriminator number being different from the first local discriminator number, (iii) the second local discriminator number is non-zero, and (iv) the local end device has restarted or rebooted,
replying to the remote end device with a second BFD control packet including the first local discriminator number of the local end device in response to determining that the second local discriminator number is known to be incorrect, and
receiving a third BFD control packet from the remote end device including the remote discriminator number associated with the remote end device and the first local discriminator number.

10. The method of claim 9, wherein the local end device is a passive device and the remote end device is an active device, and wherein the local end device and remote end device are configured to operate in a coordinated mode in which only the active device is configured to initiate a BFD session.

11. The method of claim 9, wherein the steps of receiving the first BFD control packet from the remote end device and replying to the remote end device with the second BFD control packet constitute two steps of a four-way handshaking procedure.

12. The method of claim 11, further comprising the step of utilizing the four-way handshaking procedure to re-establish the BFD session when the BFD session is down.

13. The method of claim 9, further comprising the step of re-establishing the BFD session after the local end device experiences a reboot procedure.

14. The method of claim 9, wherein the step of replying to the remote end device with the second BFD control packet, which includes the first local discriminator number, is configured to break a deadlock condition when a discriminator mismatch is detected.

15. A local end device configured for Bidirectional Forwarding Detection (BFD) communication, the local end device comprising:
a network interface configured to enable communication with a remote end device for exchanging BFD control packets,
a processing device in communication with the network interface, and a memory device configured to store a computer program having instructions that, when executed, enable the processing device to responsive to a Bidirectional Forwarding Detection (BFD) session being down and the local end device restarts or reboots with a first local discriminator number for the BFD session with a remote end device, receive a first BFD control packet from the remote end device, the first BFD control packet including a remote discriminator number associated with the remote end device and a second local discriminator number presumed to be associated with the local end device but is known to be incorrect by the local end device, wherein the second local discriminator number is presumed based on (i) the first BFD control packet having the remote discriminator number, (ii) the second local discriminator number being different from the first local discriminator number, (iii) the second local discriminator number is non-zero, and (iv) the local end device has restarted or rebooted, reply to the remote end device with a second BFD control packet including the first local discriminator number of the local end device in response to determining that the second local discriminator number is known to be incorrect, and receive a third BFD control packet from the remote end device including the remote discriminator number associated with the remote end device and the first local discriminator number.

16. The local end device of claim 15, wherein the local end device is a passive device and the remote end device is an active device, and wherein the local end device and remote end device are configured to operate in a coordinated mode in which only the active device is configured to initiate a BFD session.

17. The local end device of claim 15, wherein receiving the first BFD control packet from the remote end device and replying to the remote end device with the second BFD control packet constitute two steps of a four-way handshaking procedure utilized when the BFD session is down after the local end device experiences a reboot procedure in order to re-establish the BFD session.

18. The local end device of claim 15, wherein replying to the remote end device with the second BFD control packet, which includes the different local discriminator number, is configured to break a deadlock condition when a discriminator mismatch is detected.

19. The local end device of claim 15, wherein the second BFD control packet include a My Discriminator having the second local discriminator number of the local end device and in a down state.

* * * * *